(12) United States Patent
Hayashi et al.

(10) Patent No.: US 11,215,300 B2
(45) Date of Patent: Jan. 4, 2022

(54) PIPE JOINT AND JOINT CONNECTION DEVICE

(71) Applicant: NITTA CORPORATION, Osaka (JP)

(72) Inventors: Masafumi Hayashi, Nabari (JP); Shuichi Saga, Nabari (JP); Mizuho Hitotsubashi, Nabari (JP)

(73) Assignee: NITTA CORPORATION, Osaka (JP)

( * ) Notice: Subject to any disclaimer, the term of this patent is extended or adjusted under 35 U.S.C. 154(b) by 209 days.

(21) Appl. No.: 16/336,438

(22) PCT Filed: Sep. 28, 2017

(86) PCT No.: PCT/JP2017/035338
§ 371 (c)(1),
(2) Date: Mar. 25, 2019

(87) PCT Pub. No.: WO2018/062431
PCT Pub. Date: Apr. 5, 2018

(65) Prior Publication Data
US 2019/0285207 A1     Sep. 19, 2019

(30) Foreign Application Priority Data

Sep. 29, 2016    (JP) .............................. JP2016-190793

(51) Int. Cl.
*F16L 21/05*     (2006.01)
*F16L 39/04*     (2006.01)
(Continued)

(52) U.S. Cl.
CPC ............... *F16L 21/05* (2013.01); *F16L 37/56* (2013.01); *F16L 39/04* (2013.01); *F16L 37/32* (2013.01)

(58) Field of Classification Search
CPC . F16L 21/05; F16L 39/04; F16L 37/32; F16L 37/56
See application file for complete search history.

(56) References Cited

U.S. PATENT DOCUMENTS 3,563,267 A * 2/1971 Thompson .............. F16L 37/60
                                    137/329.1
3,638,675 A * 2/1972 Dockery ................. F16L 37/38
                                      137/550

(Continued)

FOREIGN PATENT DOCUMENTS

CN          105090650       11/2015
DE          19938876        3/2001

(Continued)

OTHER PUBLICATIONS

International Search Report dated Nov. 28, 2017 in International Application No. PCT/JP2017/035338.

(Continued)

*Primary Examiner* — James M Hewitt, II
(74) *Attorney, Agent, or Firm* — Wentsler LLC

(57) ABSTRACT

A pipe joint and a joint connection device have simpler configurations while preventing fluid leakage and absorbing misalignment of shaft centers. A pipe joint includes a male joint and a female joint into which the male joint is inserted. The male joint has a male joint main body and a cap that is fixed at a base end of the male joint main body, with a male joint O-ring interposed between the cap and the male joint main body. The cross-section diameter of the male joint O-ring is 3 to 10 mm, and a clearance-between the male joint main body and the cap is 3 to 13% of the cross-section diameter of the male joint O-ring.

11 Claims, 5 Drawing Sheets

(51) Int. Cl.
*F16L 37/56* (2006.01)
*F16L 37/32* (2006.01)

(56) References Cited

U.S. PATENT DOCUMENTS

| | | | | |
|---|---|---|---|---|
| 4,090,539 | A | * 5/1978 | Krupp | B67D 7/54 |
| | | | | 141/198 |
| 4,186,946 | A | 2/1980 | Snow | |
| 4,203,321 | A | * 5/1980 | Vyse | F16L 37/56 |
| | | | | 73/168 |
| 4,993,756 | A | 2/1991 | Bechu | |
| 5,297,574 | A | * 3/1994 | Healy | B67D 7/3218 |
| | | | | 137/614.04 |
| 6,227,173 | B1 | 5/2001 | Bennett | |
| 6,324,962 | B1 | * 12/2001 | Majkrzak | F16L 39/00 |
| | | | | 285/124.5 |
| 2013/0192800 | A1 | 8/2013 | Tiberghien et al. | |
| 2013/0214527 | A1 | 8/2013 | Gross | |
| 2017/0350547 | A1 | * 12/2017 | Tiberghien | F16L 37/34 |

FOREIGN PATENT DOCUMENTS

| | | |
|---|---|---|
| EP | 0373985 | 6/1990 |
| EP | 2623916 | 8/2013 |
| JP | 1977-29620 U | 3/1977 |
| JP | 1978-141924 A | 12/1978 |
| JP | 1984-18224 Y2 | 5/1984 |
| JP | 1984-151687 A | 8/1984 |
| JP | 1985-187019 U | 12/1985 |
| JP | 1991-46307 Y2 | 9/1991 |
| JP | 1992-114175 U | 10/1992 |
| JP | 1994-61469 U | 8/1994 |
| JP | 1996-128581 A | 5/1996 |
| JP | 2013-169469 A | 9/2013 |

OTHER PUBLICATIONS

Office action dated Jun. 2, 2020 in corresponding Chinese patent application 201780058829.9.

Extended European Search Report dated Mar. 12, 2020 in corresponding European patent application 17856380.5.

* cited by examiner

PIPE JOINT AND JOINT CONNECTION DEVICE

TECHNICAL FIELD

The present invention relates to a pipe joint and a joint connection device.

BACKGROUND ART

There has been disclosed a pipe joint that includes a male joint and a female joint and is connected by inserting the male joint into the female joint, and that can provide sealability even when there is misalignment of the male joint and the female joint in the direction of the shaft centers (e.g., Patent Literature 1). In the pipe joint of Patent Literature 1, the male joint has a base body and a connection body, and these base body and connection body are elastically supported through an elastic body having a V-shaped cross-section. In this case, when there is misalignment of the shaft centers of the male joint and the female joint of the pipe joint, the connection body shifts relative to the base body by deforming the elastic body, so that the centers of the male joint and the female joint are aligned.

CITATION LIST

Patent Literature

Patent Literature 1: Japanese Utility Model Publication No. H03-46307

SUMMARY OF INVENTION

Technical Problem

In the case of Patent Literature 1, while the elastic body is elastic enough to allow the connection body to shift relative to the base body, there is concern that adequate sealability may not be provided. Patent Literature 1 states that fluid leakage can be reliably prevented by providing O-rings between this elastic body and the base and connection bodies.

An object of the present invention is to provide a pipe joint and a joint connection device that have simpler configurations and yet can prevent fluid leakage and absorb misalignment of shaft centers.

Solution to Problem

A pipe joint includes a male joint and a female joint into which the male joint is inserted. The male joint has a male joint main body and a cap that is fixed at a base end of the male joint main body, with a male joint O-ring interposed between the cap and the male joint main body. The cross-section diameter of the male joint O-ring is 3 to 10 mm, and a clearance between the male joint main body and the cap is 3 to 13% of the cross-section diameter of the male joint O-ring.

A joint connection device according to the present invention includes a male connection unit having a plurality of the male joints and a female connection unit having a plurality of the female joints. The male joints and the female joints are connected to each other as the male connection unit is placed on the female connection unit.

Advantageous Effects of Invention

The present invention allows the male joint and the female joint to be connected to each other while absorbing misalignment of the shaft centers and maintaining the sealability by compressive deformation of the male joint O-ring in a radial direction.

DESCRIPTION OF EMBODIMENT

Figure 1:
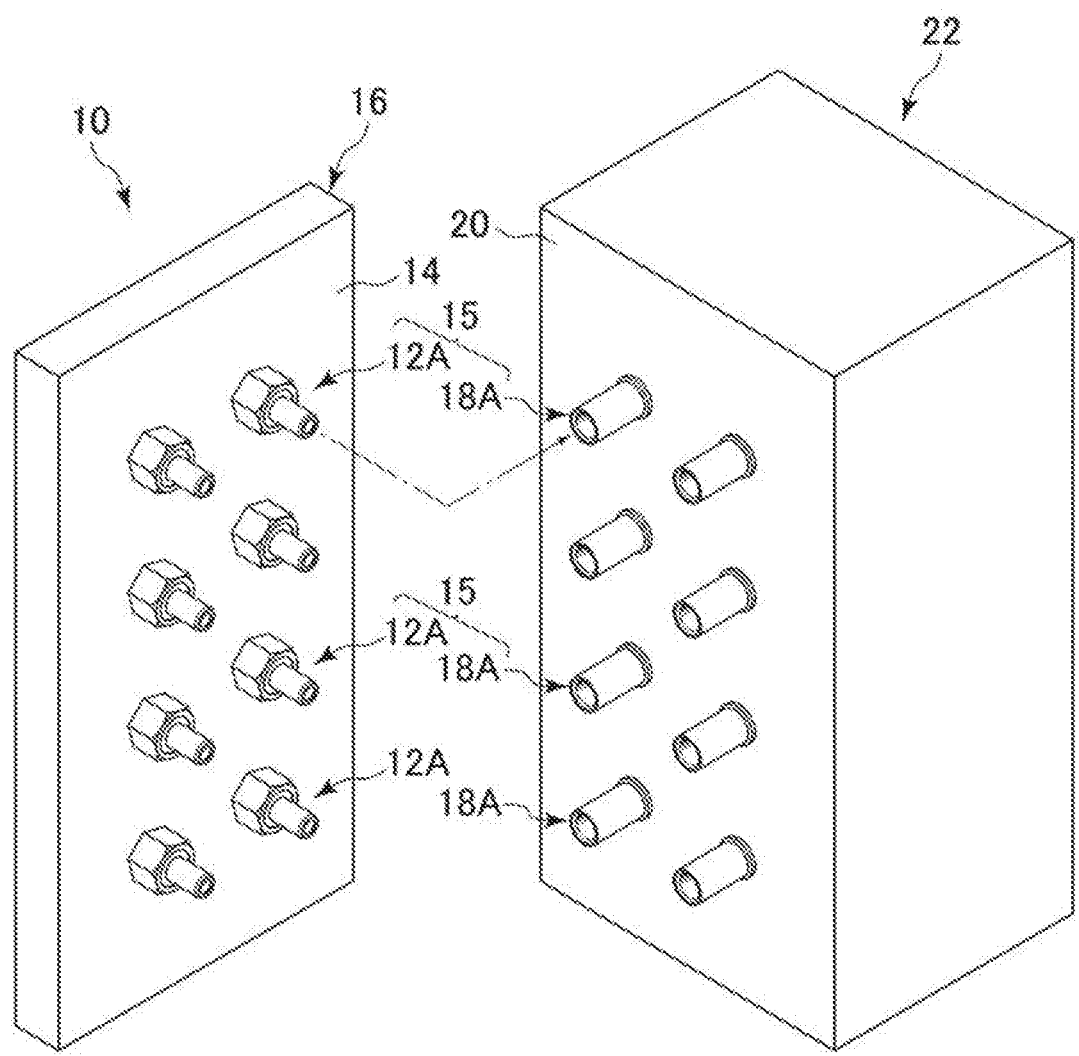
FIG. 1 is a perspective view showing the configuration of a joint connection device according to an embodiment.

An embodiment of the present invention will be described below in detail with reference to the drawings. A joint connection device 10 shown in FIG. 1 includes a male connection unit 16 having a plurality of male joints 12A and a plate main body 14 to which the plurality of male joints 12A is fixed, and a female connection unit 22 having a plurality of female joints 18A and a structure 20 to which the plurality of female joints 18A is fixed. A pipe joint 15 composed of the male joint 12A and the female joint 18A is a quick joint. The joint connection device 10 allows one to connect the male joints 12A and the female joints 18A to each other at once by placing the male connection unit 16 on the female connection unit 22. In the case of this embodiment, there are eight pipe joints 15, i.e., eight each of the male joints 12A and the female joints 18A.

The male joints 12A protrude from one surface of the metal or plastic plate main body 14. On the other surface of the plate main body 14, pipes are respectively connected to the male joints 12A (not shown). The female joints 18A are fixed to one surface of the rectangular parallelepiped metal or plastic structure 20. On the other surface of the structure 20, one pipe is connected. The structure 20 has a branch structure (not shown) by which a fluid supplied through one pipe is divided into a plurality of (in the case of FIG. 1, eight) pipes.

Figure 2:
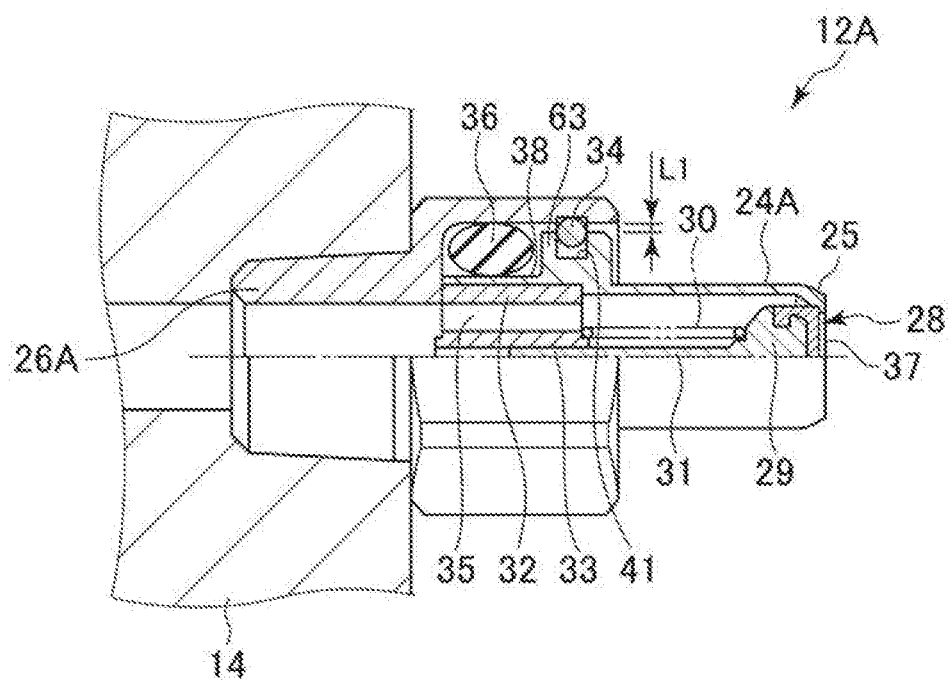
FIG. 2 is a sectional view showing the configuration of a male joint according to the embodiment.

As shown in FIG. 2, the male joint 12A includes a male joint main body 24A that is made of metal or resin and a cap 26A that is fixed at a base end of the male joint main body 24A. The male joint main body 24A is a cylindrical member, and a first valve body 28 and a first holder 32 that supports the first valve body 28 are provided inside the male joint main body 24A. The first valve body 28 has a valve part 29 and a shaft part 31 formed coaxially with the valve part 29, and is pressed toward a leading end by a coil spring 30 provided between the first valve body 28 and the first holder 32. The first holder 32 has a support hole 33 in which the shaft part 31 is supported so as to be movable in an axial direction, and a plurality of through-holes 35 that extends through the first holder 32 in an axial direction of the male joint main body 24A. The male joint main body 24A is tapered at the leading end, and a first orifice 37 is closed as the first valve body 28 comes into contact with an inner circumferential surface of the leading end. The male joint main body 24A has a tapered surface 25 on an outer circumference at the leading end.

The male joint main body 24A has, at a base end side, a first mounting shaft 38 on which a male joint O-ring 36 is mounted. The male joint O-ring 36 seals a gap between the male joint main body 24A and the cap 26A, and supports male joint main body 24A of the male joint 12A so as to be movable in a radial direction relative to the plate main body 14 and the cap 26A. The cross-section diameter of the male joint O-ring 36 is 3 to 10 mm. A clearance L1 between the male joint main body 24A and the cap 26A is 3 to 13% of the cross-section diameter of the male joint O-ring 36. Thus, a squeeze allowance for the male joint O-ring 36 is 8 to 25%. The male joint main body 24A has a flange 63 integrally formed at the leading end side of the first mounting shaft 38. A mounting groove 41 is provided at the leading end side of the flange 63.

In the case of this embodiment, the male joint main body 24A and the cap 26A are fixed to each other in the axial direction, with the male joint O-ring 36 interposed therebetween, by a snap ring 34 provided between the male joint main body 24A and the cap 26A. The snap ring 34 is mounted in the mounting groove 41. An annular groove is formed in an inner circumferential surface of the cap 26A, at a position corresponding to the mounting groove 41. The snap ring 34 is disposed in a space formed by the mounting groove 41 and the annular groove. As the flange 63 is fixed by the snap ring 34, the male joint main body 24A is fixed to the cap 26A in the axial direction. The cap 26A has an external thread formed on an outer circumferential surface at a base end, and the cap 26A is screwed into the plate main body 14 and thereby fixed to the plate main body 14.

Figure 3:
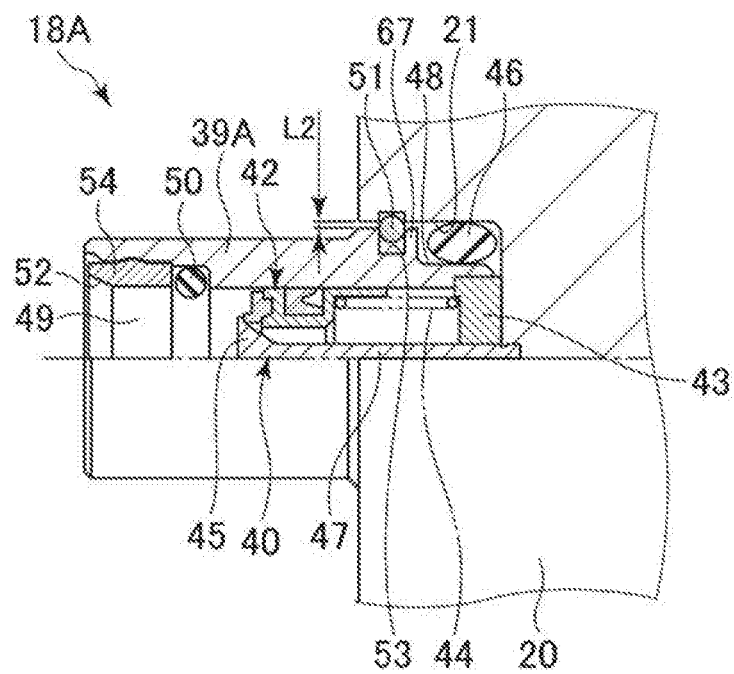
FIG. 3 is a sectional view showing the configuration of a female joint according to the embodiment.

As shown in FIG. 3, the female joint 18A has a female joint main body 39A that is made of metal or resin, a second valve body 40 that is provided inside the female joint main body 39A, a sleeve 42 that is movable in an axial direction between the second valve body 40 and the female joint main body 39A, and a second holder 43 that supports the second valve body 40. The female joint main body 39A is a cylindrical member, and an O-ring 50 that seals around an outer circumferential surface of the male joint main body 24A is retained at a leading end side. The female joint main body 39A has a tapered surface 52 on an inner circumference at the leading end. In the case of FIG. 3, the O-ring 50 is retained by a cylindrical O-ring retainer 54. The O-ring retainer 54 has an annular projection on an outer circumferential surface. The O-ring retainer 54 is fixed to the female joint main body 39A by having this annular projection fitted in the annular groove formed in the inner circumference of the female joint main body 39A at the leading end side. The tapered surface 52 is formed on an inner circumference of the O-ring retainer 54 at a leading end.

The second valve body 40 has a valve part 45 and a shaft part 47 formed coaxially with the valve part 45. The shaft part 47 is fixed to the second holder 43. The sleeve 42 is a cylindrical member, and is pressed toward the leading end by a coil spring 44 provided between the sleeve 42 and the second holder 43. A second orifice 49 is closed as a leading end of the sleeve 42 comes into contact with an outer circumferential end of the valve part 45.

The female joint main body 39A has, at the base end side, a second mounting shaft 48 on which a female joint O-ring 46 is mounted. The female joint O-ring 46 seals a gap between the female joint 18A and the structure 20, and supports the female joint 18A so as to be movable in a radial direction relative to the structure 20. The cross-section diameter of the female joint O-ring 46 is preferably 3 to 10 mm. A clearance L2 between the female joint main body 39A and the structure 20 is preferably 3 to 13% of the cross-section diameter of the female joint O-ring 46. Thus, a squeeze allowance for the female joint O-ring 46 is preferably 8 to 25%. The female joint main body 39A has a flange 67 integrally formed at the leading end side of the second mounting shaft 48. A mounting groove 53 is provided at the leading end side of the flange 67.

In the case of this embodiment, the female joint 18A and the structure 20 are fixed to each other in the axial direction by a snap ring 51 provided between the female joint main body 39A and the structure 20. The snap ring 51 is mounted in the mounting groove 53. An annular groove is formed in an inner circumferential surface of a fixing hole 21 of the structure 20, at a position corresponding to the mounting groove 53. The snap ring 51 is disposed in a space formed by the mounting groove 53 and the annular groove. As the flange 67 is fixed by the snap ring 51, the female joint 18A is fixed to the structure 20 in the axial direction.

Figure 4:
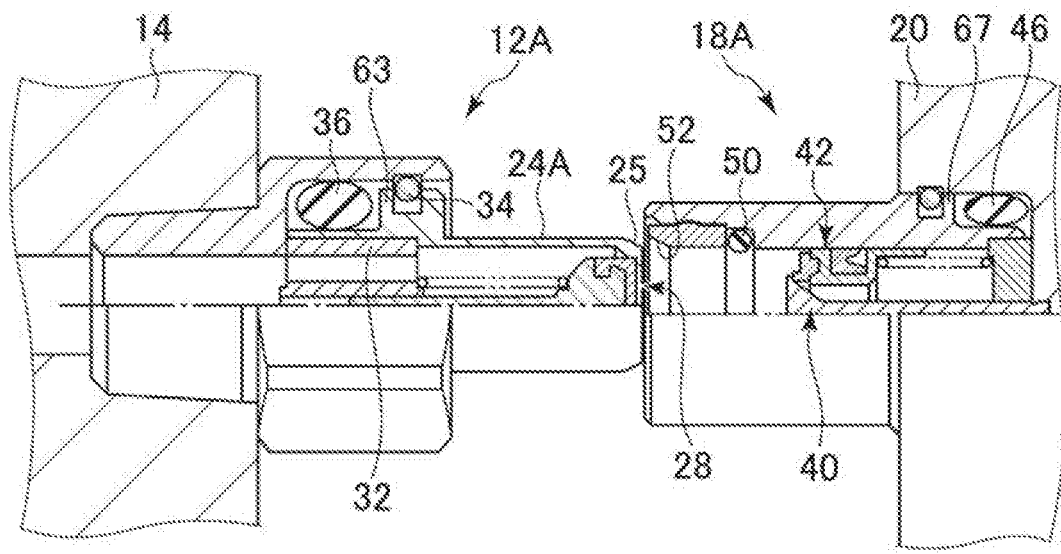
FIG. 4 is a sectional view showing a state immediately before the male joint is connected to the female joint.

Next, the workings and effects of the pipe joint 15 configured as has been described above will be described. To connect the male joint 12A and the female joint 18A to each other, the male joint 12A is disposed coaxially with the female joint 18A (FIG. 4). The following description is based on a state where the shaft center of the male joint 12A is misaligned upward from the shaft center of the female joint 18A as shown in FIG. 4. In this state, the male joint 12A is inserted into the female joint 18A. Since the male joint 12A has the tapered surface 25 on the outer circumference at the leading end and the female joint 18A has the tapered surface 52 on the inner circumference at the leading end, the male joint 12A can be easily inserted into the female joint 18A.

Figure 5:
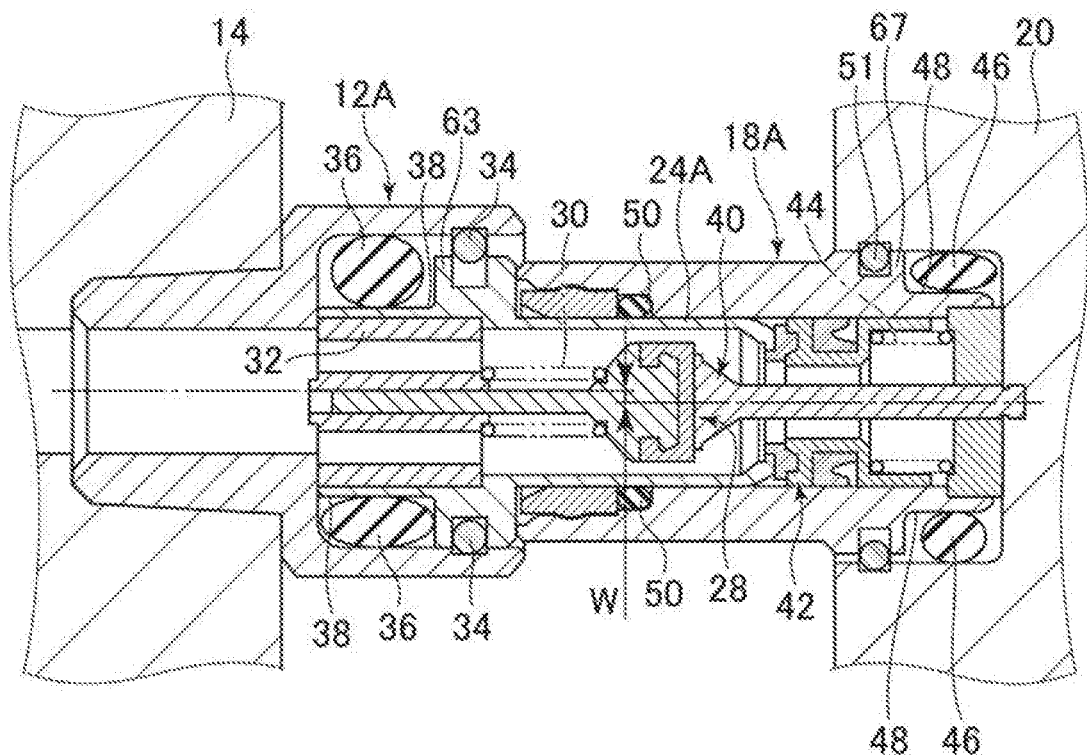
FIG. 5 is a sectional view showing a state where the male joint is connected to the female joint.

When the male joint 12A is inserted into the female joint 18A, the outer circumferential surface of the male joint 12A comes into contact with the O-ring 50. By having the outer circumferential surface of the male joint 12A in contact with the O-ring 50, the pipe joint 15 prevents fluid leakage through a gap between the male joint 12A and the female joint 18A. The leading end of the male joint main body 24A comes into contact with the sleeve 42. When the male joint 12A is further inserted, the sleeve 42 is moved backward by the male joint main body 24A. As the sleeve 42 is separated from the second valve body 40, the second orifice 49 is opened (FIG. 5).

Meanwhile, the second valve body 40 comes into contact with the first valve body 28, and the first valve body 28 is moved backward. As the first valve body 28 is separated from the leading end of the male joint main body 24A, the first orifice 37 is opened. Thus, the male joint 12A and the female joint 18A are connected to each other and flow paths are joined together in the pipe joint 15.

Here, misalignment of the shaft centers of the male joint 12A and the female joint 18A is absorbed by the male joint O-ring 36 and the female joint O-ring 46. For example, when the shaft center of the male joint 12A is located above the shaft center of the female joint 18A as shown in FIG. 5, inserting the male joint 12A into the female joint 18A causes a lower part of the male joint O-ring 36 to undergo compressive deformation in the radial direction and an upper part of the female joint O-ring 46 to undergo compressive deformation in the radial direction. The misalignment of the shaft centers is thus absorbed by the male joint O-ring 36 and the female joint O-ring 46 undergoing compressive deformation in the radial direction. In the case of this embodiment, the clearances L1, L2 are 3 to 13% respectively of the cross-section diameters of the male joint O-ring 36 and the female joint O-ring 46. Thus, even when there is misalignment of the shaft centers of 0.1 to 1.3 mm, the pipe joint 15 can allow the male joint 12A and the female joint 18A to be connected to each other while maintaining the sealability.

Even when there is misalignment of the shaft centers of each pair of a plurality of male joints 12A and a plurality of female joints 18A, the joint connection device 10 allows one to connect all the pipe joints 15, while maintaining the sealability, by a single action of placing the male connection unit 16 on the surface of the female connection unit 22. This can improve the efficiency of the work of branching one pipe and connecting the branch pipes to a plurality of pipes.

When all the pipe joints 15 are connected, the joint connection device 10 can divide a fluid supplied to the female connection unit 22 into the eight pipe joints 15 and supply the fluid to each of the eight pipes connected to the male connection unit 16.

Modified Examples

The present invention is not limited to the above embodiment but can be modified as appropriate within the scope of the gist of the invention.

For example, the case where all the plurality of pipe joints of the joint connection device 10 shown in FIG. 1 is of the same type has been described. However, the present invention is not limited to this example, and the joint connection device 10 may include different pipe joints, for example, pipe joints that are different from one another in the outside diameter or in the configuration of the valve body.

In the above embodiment, the case where the number of the pipe joints 15 is eight has been described. However, the present invention is not limited to this example, and the number of the pipe joints 15 may be seven or smaller or nine or larger.

In the above embodiment, the case where the male joint main body and the cap, and the female joint and the structure, are fixed to each other by the snap rings has been described, but the present invention is not limited to this example. A pipe joint according to a modified example will be described with reference to FIG. 6 to FIG. 8. Those components that are the same as in the above embodiment will be denoted by the same reference signs while the description thereof will be omitted.

Figure 6:
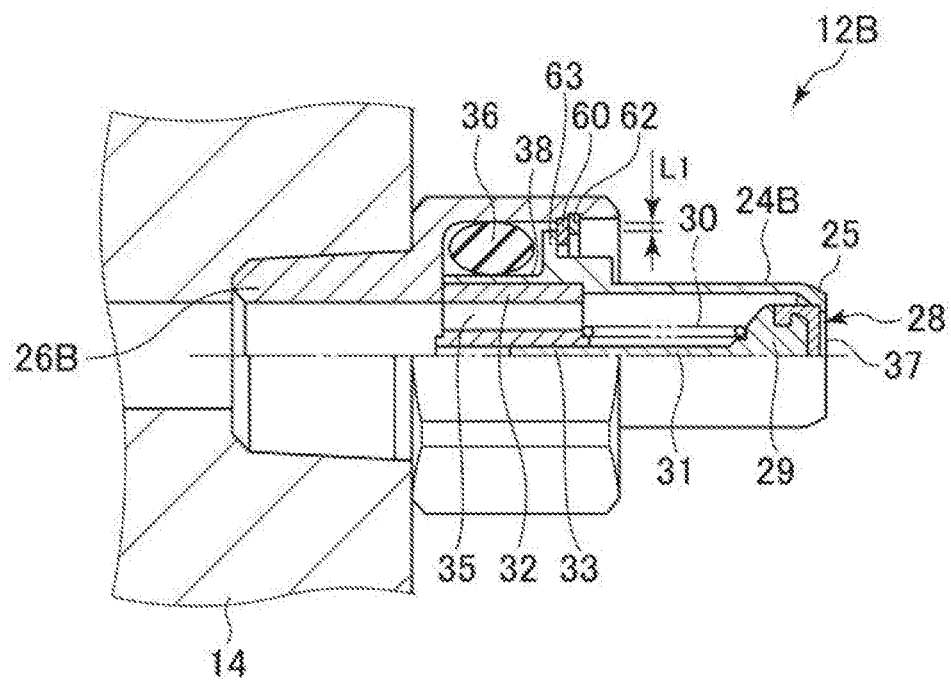
FIG. 6 is a sectional view showing the configuration of a male joint according to a modified example.

A male joint 12B shown in FIG. 6 is provided with a washer 60 and a retaining ring 62 on a male joint main body 24B. The male joint 12B has the flange 63 integrally formed at the leading end side of the first mounting shaft 38, and the washer 60 is provided at the leading end side of the flange 63. The retaining ring 62 is provided in contact with a leading end-side surface of the washer 60. The washer 60 and the retaining ring 62 have rectangular cross-sections. The outside diameter of the washer 60 is larger than the inside diameter of the retaining ring 62, and the inside diameter of the washer 60 is smaller than the inside diameter of the retaining ring 62 and the outside diameter of the flange 63. For example, a C-ring can be used as the retaining ring 62. An annular groove is provided in an inner circumferential surface of a cap 26B, at a position corresponding to the washer 60 and the retaining ring 62. As the washer 60 and the retaining ring 62 get stuck in the groove of the cap 26B, the male joint main body 24B and the cap 26B are fixed to each other in the axial direction.

Figure 7:
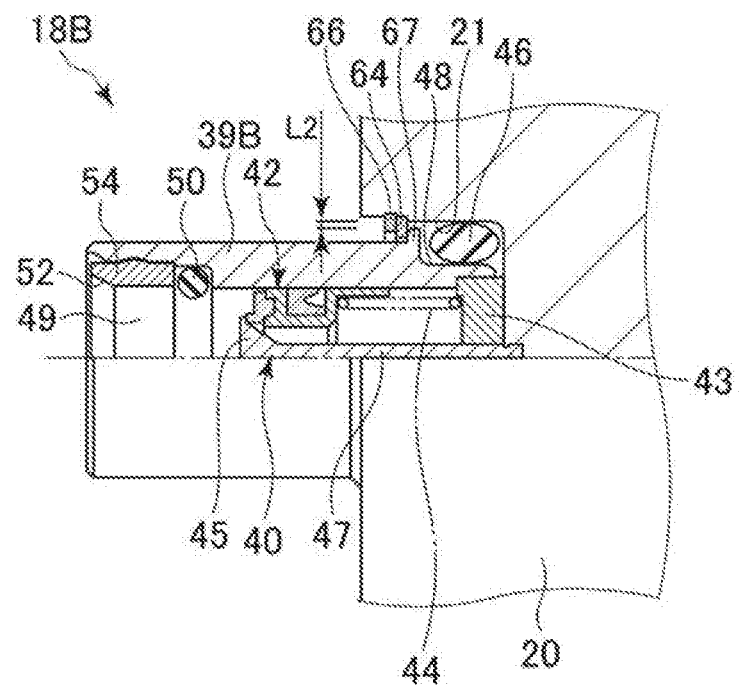
FIG. 7 is a sectional view showing the configuration of a female joint according to the modified example.

A female joint 18B shown in FIG. 7 is provided with a washer 64 and a retaining ring 66. A female joint main body 39B has the flange 67 integrally formed at the leading end side of the second mounting shaft 48, and the washer 64 is provided at the leading end side of the flange 67. The retaining ring 66 is provided in contact with a leading end-side surface of the washer 64. The configurations of the washer 64 and the retaining ring 66 are the same as in the male joint 12B, and therefore the description thereof will be omitted. An annular groove is provided in the inner circumferential surface of the hole of the structure 20, at a position corresponding to the washer 64 and the retaining ring 66. As the washer 64 and the retaining ring 66 get stuck in the groove of the structure 20, the female joint 18B is fixed to the structure 20 in the axial direction.

Figure 8:
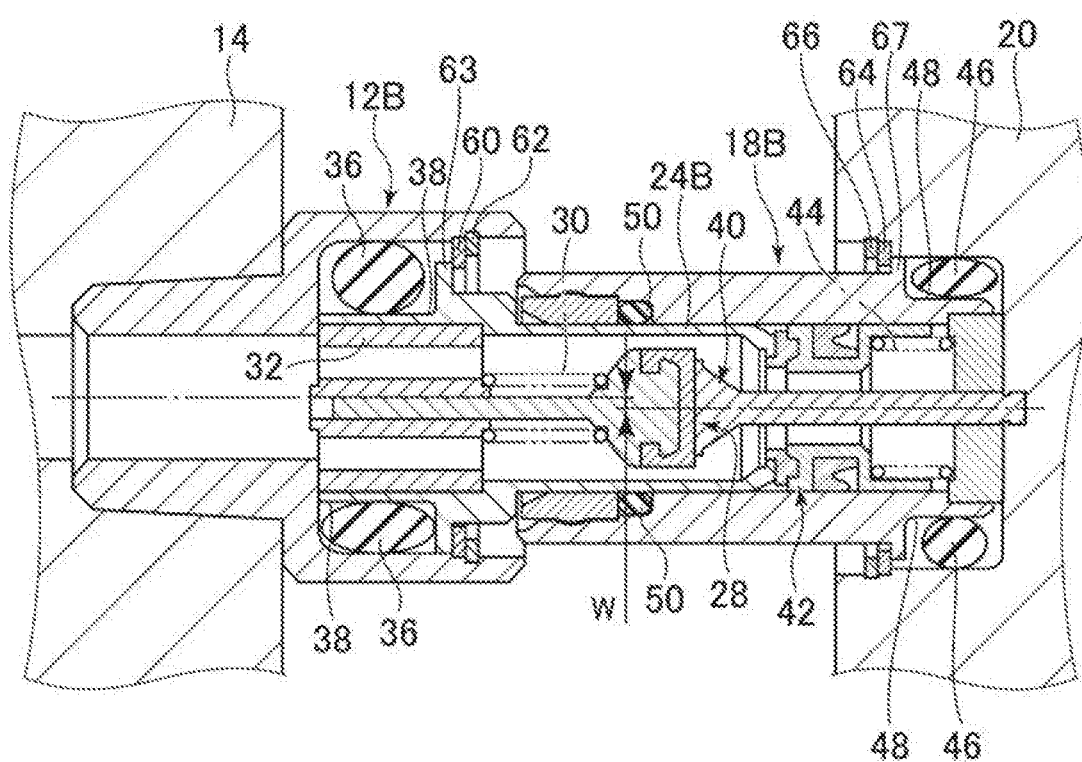
FIG. 8 is a sectional view showing a state where the male joint of the modified example is connected to the female joint of the modified example.

In the case of this modified example, the male joint O-ring 36 undergoes compressive deformation in the radial direction, which produces the same effect as in the above embodiment. Moreover, even when misalignment of the centers of the male joint 12B and the female joint 18B occurs, the washers 60, 64 prevent the flanges 63, 67 from slipping off the retaining rings 62, 66, so that the male joint main body 24B and the cap 26B, and the female joint 18B and the structure 20, can be maintained in a state of being fixed to each other in the axial direction (FIG. 8).

Since the washers 60, 64 and the retaining rings 62, 66 have rectangular cross-sections, a larger contact area is secured between the male joint main body 24B and the female joint 18B, which can improve the pressure resistance.

REFERENCE SIGNS LIST

10 Joint connection device
12A, 12B Male joint
15 Pipe joint
16 Male connection unit
18A, 18B Female joint
22 Female connection unit
24A, 24B Male joint main body
25 Tapered surface
26A, 26B Cap
36 Male joint O-ring
38 First mounting shaft
39A, 39B Female joint main body
46 Female joint O-ring
48 Second mounting shaft
L1 Clearance

The invention claimed is:
1. A pipe joint comprising a male joint fixed to a plate main body and a female joint into which the male joint is inserted,
   wherein the male joint has:
      a male joint main body; and
      a cap that is fixed at a base end of the male joint main body, with a male joint O-ring interposed between the cap and the male joint main body,
   wherein a cross-section diameter of the male joint O-ring is 3 to 10 mm,
   wherein a clearance between the male joint main body and the cap is 3 to 13% of the cross-section diameter of the male joint O-ring, and
   wherein the male joint O-ring seals a gap between the male joint main body and the cap.
2. The pipe joint according to claim 1,
   wherein the female joint has, at a base end:
      a second mounting shaft; and a female joint O-ring mounted on the second mounting shaft,
wherein a cross-section diameter of the female joint O-ring is 3 to 10 mm, and
wherein a clearance between the female joint and a fixing hole of a structure to which the female joint is fixed is 3 to 13% of the cross-section diameter of the female joint O-ring.

3. The pipe joint according to claim 1, wherein the male joint has a tapered surface at a leading end that is inserted into the female joint.

4. The pipe joint according to claim 1, wherein the male joint main body and the female joint each have:
a washer; and
a retaining ring provided at a leading end side of the washer.

5. A joint connection device having a plurality of pipe joints according to claim 1, comprising:
a male connection unit having a plurality of the male joints; and
a female connection unit having a plurality of the female joints,
wherein the male joints and the female joints are connected to each other as the male connection unit is placed on the female connection unit.

6. A pipe joint comprising a male joint and a female joint that is connected to the male joint,
wherein the male joint has:
a cylindrical male joint main body having a leading end that is inserted into the female joint, and a base end on an opposite side of the leading end;
a cap that is provided to cover the base end of the cylindrical male joint main body, the cap accommodating the cylindrical male joint main body such that the cylindrical male joint main body is movable in a radial direction relative to the cap; and
a male joint O-ring that is provided between the cylindrical male joint main body and the cap, the male joint O-ring seals a gap between the cylindrical male joint main body and the cap;
wherein a cross-section diameter of the male joint O-ring is 3 to 10 mm, and
wherein the cylindrical male joint main body further has a male joint flange that is provided so as to protrude in the radial direction, and the male joint flange defines a minimum gap between the cylindrical male joint body and the cap in the radial direction that is 3 to 13% of the cross-section diameter of the male joint O-ring.

7. The pipe joint according to claim 6, further comprising a male snap ring that is configured to engage the male joint flange and the cap to fix the cylindrical male joint main body to the cap in the axial direction.

8. The pipe joint according to claim 6, further comprising a male joint washer that is provided so as to protrude from the cap in the radial direction and that abuts in the axial direction on the male joint flange to prevent the cylindrical male joint main body from slipping off the cap.

9. The pipe joint according to claim 6,
wherein the female joint has:
a cylindrical female joint main body having a leading end into which the cylindrical male joint main body, and a base end on an opposite side of the leading end; and
a female joint O-ring that is mounted on the cylindrical female joint main body and that seals a gap between the cylindrical female joint main body and a structure provided so as to cover the base end of the cylindrical female joint main body, the structure accommodating the cylindrical female joint main body such that the cylindrical female joint body is movable in a radial direction relative to the structure,
wherein a cross-section diameter of the female joint O-ring is 3 to 10 mm, and
wherein the cylindrical female joint main body further has a female joint flange that is provided so as to protrude in the radial direction, the female joint flange defines a minimum gap between the cylindrical female joint body and the structure in the radial direction that is 3 to 13% of the cross-section diameter of the female joint O-ring.

10. The pipe joint according to claim 9, further comprising a female snap ring that is provided between the female joint flange and the structure and that fixes the cylindrical female joint main body to the structure in the axial direction.

11. The pipe joint according to claim 9, further comprising a female joint washer that is provided so as to protrude from the structure in the radial direction and that abuts in the axial direction on the female joint flange to prevent the cylindrical female joint main body from slipping off the structure.

* * * * *